United States Patent [19]

Shirey

[11] Patent Number: 5,094,490
[45] Date of Patent: Mar. 10, 1992

[54] RATCHETED COUPLING

[76] Inventor: Walter F. Shirey, RD #1 - Box 208 AA, Sligo, Pa. 16255

[21] Appl. No.: 591,750

[22] Filed: Oct. 2, 1990

[51] Int. Cl.⁵ .................. F16L 15/00; F16L 19/00
[52] U.S. Cl. ................................ 285/24; 285/38; 285/39; 285/309; 285/912; 81/61
[58] Field of Search ............... 285/24, 38, 39, 309, 285/308, 912; 403/321, 322, 325, 328; 81/61, 62; 29/525.1

[56] References Cited

U.S. PATENT DOCUMENTS

| | | | |
|---|---|---|---|
| 1,046,328 | 12/1912 | Preuss | 285/912 |
| 1,761,157 | 1/1928 | Schellin | 285/38 |
| 2,828,982 | 12/1955 | Kennedy | 285/310 |
| 3,077,801 | 2/1963 | Rostad | 81/61 |
| 3,149,707 | 9/1964 | McInnis | 81/62 |
| 4,040,650 | 8/1977 | Shotbolt | 285/912 |
| 4,172,472 | 10/1979 | Parrish | 29/525.1 |
| 4,258,595 | 3/1981 | Ramsey | 81/61 |
| 4,380,859 | 4/1983 | Yamazaki | 29/525.1 |
| 4,423,774 | 1/1984 | Mefford | 285/912 |
| 4,722,557 | 2/1988 | Bormioli | 285/912 |

FOREIGN PATENT DOCUMENTS 1001047  6/1964  United Kingdom ............... 285/912

Primary Examiner—Randolph A. Reese
Assistant Examiner—Timothy Aberle
Attorney, Agent, or Firm—Richard C. Litman

[57] ABSTRACT

A rotational power coupling consists of drive shaft couplings and stationary housings within which the shafts rotate. One housing has a flange with external threads; the other has a plain flange. A threaded nut engages the threaded flange and draws the two flanges together, locking the housings. The nut is surrounded by a collar which can rotate about it. A handle extends from the collar. The nut has external teeth, and the collar has oppositely directed pawls. When the pawls engage the teeth, the handle may be used to turn the collar.

2 Claims, 2 Drawing Sheets

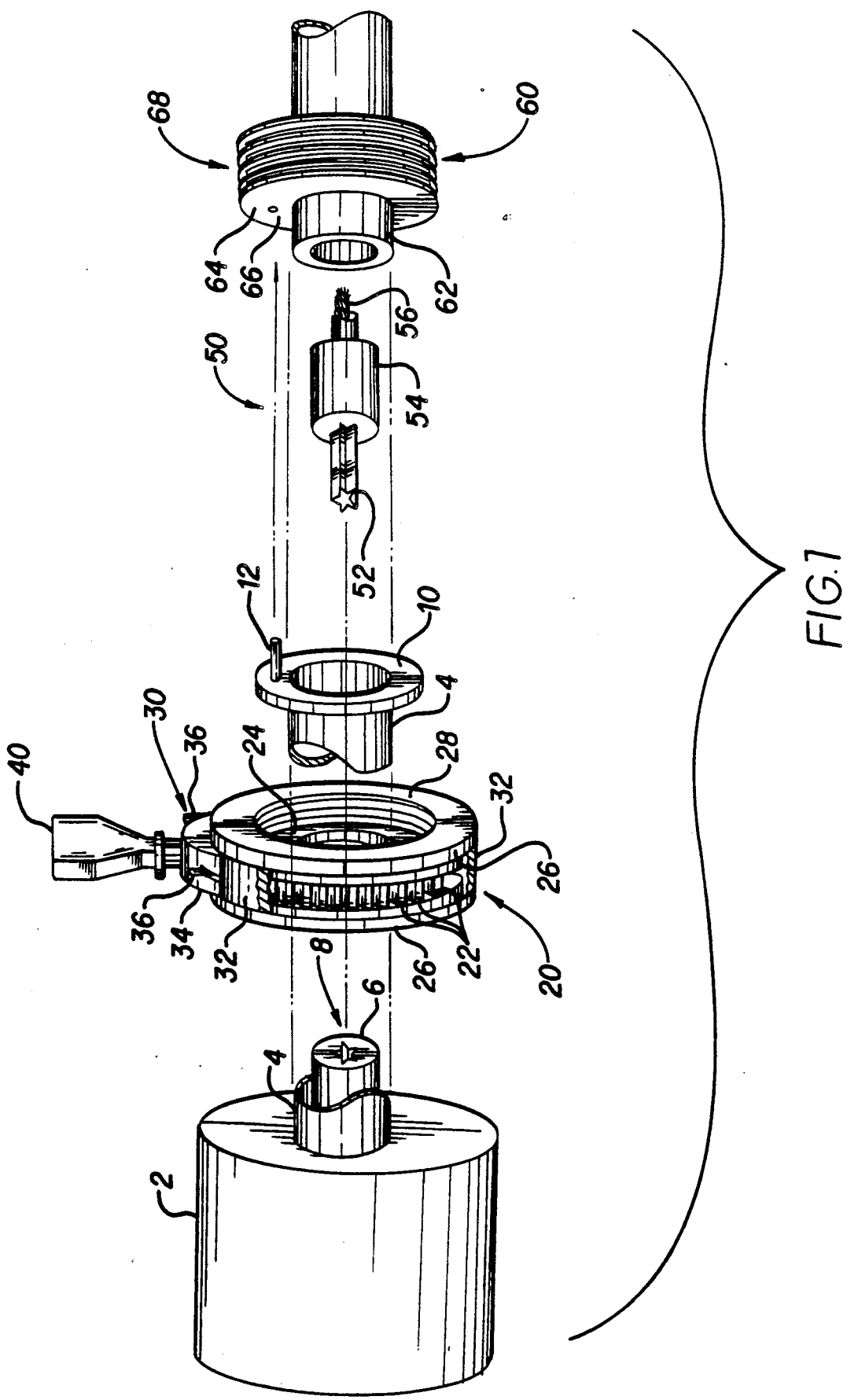

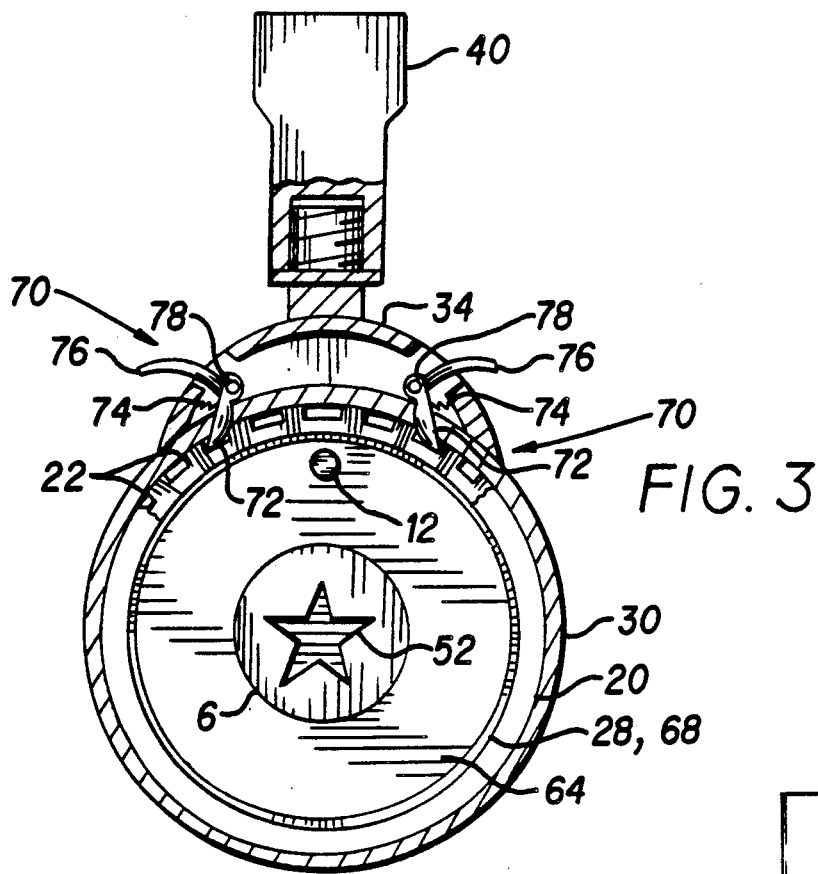
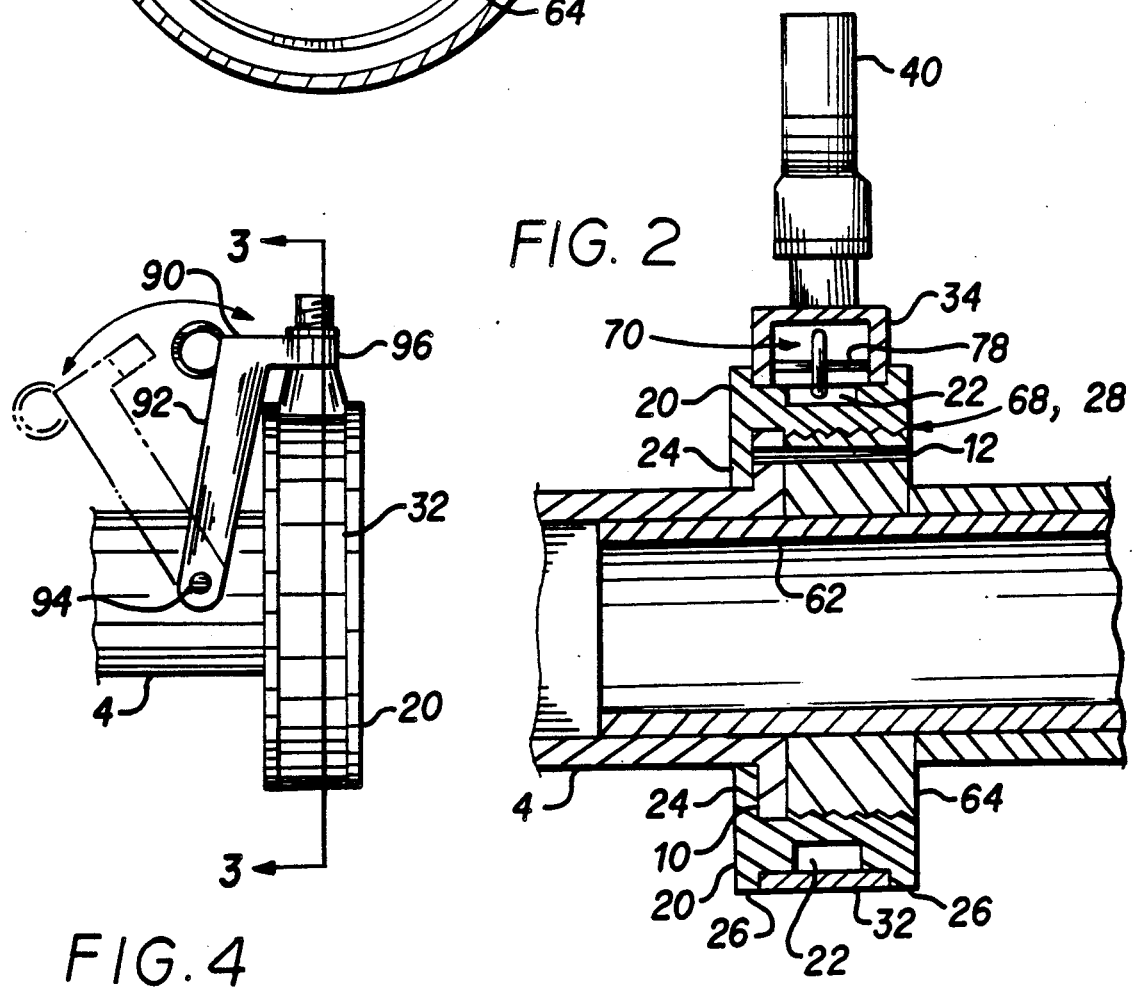

RATCHETED COUPLING

FIELD OF THE INVENTION

The present invention relates to rotating drive couplings which connect without tools.

DESCRIPTION OF THE PRIOR ART

Mechanical couplings which transmit rotation take many forms. Some couplings are designed to be fastened and unfastened without tools.

An example of this is the kind of coupling found on field tractors. The power take off drive of a tractor is a round splined shaft which has a circumferential groove around the middle of the splines. The mating part from a farm machine ends in a female internally splined forging to mate with the splined shaft of the tractor. A hole is drilled through the forging, at right angles to and skew to the axis of the cylinder defining the splines. When the coupling is assembled, a bolt riding in the skew hole in the forging rests in the groove of the shaft, locking the shaft within the casting. The bolt may be moved out of the groove by pushing a button on the forging. This allows the splined shaft to be withdrawn from the forging.

Another coupling of this sort is found on certain socket wrenches. In these, a square drive plug on the wrench inserts into a corresponding cavity on the socket. The plug and cavity are locked together by a ball bearing and a detent into which the ball bearing fits. The ball is held into the detent by a mechanism, and the socket is locked onto the wrench by means of this ball and detent. When a button on the wrench is depressed, the ball is released from the detent and the socket may then be easily withdrawn.

Nelson, in U.S. Pat. No. 1,677,199, discloses a handle lock for pneumatic tools comprising two rings having mating sets of teeth, the teeth facing one another, and the two rings held together by a clip of spring steel sprung over the outside of the two rings after joining.

None of the above inventions and patents, taken either singly or in combination, is seen to describe the instant invention as claimed.

Accordingly, one object of the present invention is a coupling which can be fastened and unfastened without tools.

Another object of the present invention is a coupling which locks against accidental release.

These and other objects of the present invention will become readily apparent upon further review of the following specification and drawings.

SUMMARY OF THE INVENTION

The present invention is a rotational power coupling device comprising the following parts: male and female drive plug and socket; housings surrounding each of the drive sockets; and male and female threaded connectors to join the housings. The male housing connector threads are machined into a flange on one of the housings. The female housing includes an unthreaded flange which is borne against the threaded flange on the male housing by a rotatable nut surrounding the female housing.

The nut includes an internally threaded section (having the shape of a short length of pipe with female threads) which is integral with a flat washer section, joined at its outer periphery to one end of the first section, which bears against the female housing flange. The threads of the nut engage the threads on the threaded flange, and the female housing flange is trapped between the washer section and the threaded flange. The housing are thus joined.

The nut is circular in outline and is surrounded by a collar which fits closely to it, but can rotate relative to the nut. The nut has a radial groove around the outside perimeter with ratchet teeth, and the surrounding collar has two opposing pawls which can engage the teeth. The pawls control the relative rotation of the collar relative to the nut; when both are engaged with the teeth no relative motion is possible.

A handle is mounted on the collar near to the pawls. When the pawls are engaged with the ratchet, the handle can be used to tighten or loosen the threaded housing connections. When the pawls are disengaged, the collar spins on the nut and the handle cannot loosen or tighten the threaded housing attachment.

An alignment pin may be mounted on the female housing flange to mate with a hole drilled through the threaded male housing flange. The pin fixes the angular relationship of the two housings, but does not prevent their separation.

A locking arm may also be used to prevent motion of the collar relative to the female housing, and hence prevent loosening of the coupling.

BRIEF DESCRIPTION OF THE DRAWINGS

FIG. 1 is an exploded perspective view of the coupling, showing from left to right a motor and female drive socket, nut and collar, female housing, male drive plug, and male housing.

FIG. 2 is a partial cross-section view of the assembled coupling; the collar and nut are shown in a cross section taken through the axis of the coupling.

FIG. 3 is cross-section of the nut and collar perpendicular to the axis of the coupling.

FIG. 4 shows a locking lever for engaging the collar.

Similar reference characters denote corresponding features consistently throughout the attached drawings.

DETAILED DESCRIPTION OF THE PREFERRED EMBODIMENT

Referring to FIG. 1, a housing 4, shown discontinued or broken in the figure, extends from one end of a motor or engine 2. Inside the housing 4 is a female drive socket 6 which is internally attached to the armature of the motor or the shaft of the engine. The socket 6 contains a star-shaped cavity 8 for driving a plug adapted to fit within it.

The housing 4 is shown broken because the flange 10 at the end of the housing 4 will not pass through the nut 20, due to the presence of the washer 24, which is integral with the nut 20. This washer is of generally the same inner and outer diameters as the flange 10. The nut 20 is trapped between the motor 2 and the flange 10. When the coupling is assembled the faces of the washer 24 and the flange 10 meet, as shown in FIG. 2.

The housing 4 is long enough that the nut 20 may slide freely back and forth for some distance.

The inner diameter of the washer 24 is slightly more than the diameter of the housing 4, so that the nut 20 is free to rotate about the housing 4.

The nut 20 includes on its inside surface an internally threaded portion 28. The outer surface includes ridges 26 and centrally located ratchet teeth 22, which circumscribe the nut.

A collar 30 rides between the ridges 26 of the nut. It includes a band 32, contiguous with a housing 34 which contains pawls 70 to engage the ratchet teeth 22. A handle 40 is attached to the top of the housing 34 for turning the collar.

The pawls 70 control the relative rotation of the nut 20 and collar 30.

The parts listed above constitute the female half of the coupling. The male part is described below.

A male drive 50 engages the female drive when the coupling is assembled. The plug 52 inserts into the cavity 8 for transmitting the driving torque. A drive cylinder 54 is rotatably disposed within a housing 60. In the embodiment shown, the cylinder 54 terminates in a cable drive 56.

The housing 60 includes an extension 62 which covers the male plug 52, and which inserts into the bore of the female housing 4 in the space between the inner diameter of the housing 4, and the outer diameter of the socket 8. This extension serves to align the coupling.

The housing 60 also includes a flange 64, whose outer surface is cut with threads 68. These threads mate with the threads 28 of the nut 20 for fastening the coupling.

An alignment hole 66 is bored through the flange 64 which accepts a pin 12 extending from the flange 10. This assures angular alignment of the coupling.

In FIG. 2, a cross section of the assembled coupling is presented.

The threads 68 on the exterior of the flange 64 are shown engaged with the threads 28 of the nut 20 at the meeting of the cross-sectioned regions of the flange 64 and the nut 20. By this engagement the flange 10 of the housing 4 is drawn up tight against the flange 64 of the other housing 60.

Looking at the lower part of FIG. 2, the nut 20 is seen to include threads 28, washer 24, ridges 26, and a ratchet tooth 22. The collar 30 is located between the ridges 26; it may rotate about the nut 20 but not slide off it.

At the upper end the collar becomes a housing 34 which houses the pawls 70 which engage the ratchet teeth 22. (Only one pawl is shown in FIG. 2.) The upper end of the housing 34 has a threaded extension 38; the handle 40, which is used to rotate the collar, screws onto this.

FIG. 3 is a cross section through the assembled coupling along the line 3—3 of FIG. 4. The section of FIG. 3 is at right angles to the section of FIG. 2, and perpendicular to the axis of symmetry of the nut and housings.

As seen in FIG. 3, there are two pawls 70 which engage the ratchet teeth 22 disposed on either side of the handle 40. The left-hand pawl prevents counterclockwise motion of the collar 30 relative to the nut 20, and the right-hand pawl prevents clockwise relative motion.

The bilateral symmetry of the pawls is reflected in the bilateral symmetry of each ratchet tooth; any tooth may engage either pawl at various times, so the two faces of any tooth are similarly shaped mirror images. (This symmetry is atypical of ratchet teeth, which are usually canted one way for interaction with a single pawl.)

Each pawl 70 includes a tooth-engaging tip 72, and a finger tab 76. A hinge pin 78 passes through both the pawl 70 and the housing 34 to allow rotation of the pawl 70 about the hinge pin 78. A spring 74 urges the pawl to rotate so that the tip 72 is against the nut 20 and between the teeth 22.

Still referring to the cross section of FIG. 3, several nesting concentric circles are seen. Drive plug 52 and round drive socket 6 occupy the center. The larger circle outside the socket 6 is the housing 60, cut through the region that includes the flange 64. At the circumference is a narrow band representing the threads 68 and 28. Proceeding outward, the nut 20 with teeth 22 are first shown, and finally the collar 30 and housing 34 with pawls 70 and handle 40.

The alignment pin 12 appears as a circle in the upper portion of the flange 64.

If the coupling is subjected to vibration, it may result in rotation of the nut 20 relative to the coupling, whereby the nut 20 may disengage from the threaded flange 64 and the coupling fall apart. To prevent this, a locking lever 90 may be mounted upon the housing 4, as shown in FIG. 4. This lever will have forked or bifurcated legs 92 straddling the housing 4. These legs will rotate upon pins 94 set into the surface of the housing 4. The upper end of the lever 90 has means to engage the handle 40 and thereby prevent the collar 30 from turning relative to the housing 4; this prevents loosening of the threads. The means shown is a semi-circular clip 96 which encircles slightly more than half of the round base or shank of the handle 40. It is made of elastic material, and springs onto the shank of the handle 40.

It is to be understood that the present invention is not limited to the sole embodiment described above, but encompasses any and all embodiments within the scope of the following claims.

I claim:

1. A rotational power coupling of the type having
    mating drivers engageable by relative axial displacement of said drivers,
    a first housing having a first flange, said first flange including external threads on the perimeter thereof,
    a second housing having a second flange adapted to contact said first flange upon relative axial movement, and
    a nut having internal threads adapted to mate with said external threads, said nut adapted to contact said second flange for holding said second flange in contact with said first flange, and thereby holding said first housing in contact with said second housing,
    wherein the improvement comprises:
    a plurality of gearlike teeth disposed circumferentially about said nut;
    a collar rotatably encircling said nut;
    at least one pawl engageable with said teeth, said pawl hingedly attached to said collar;
    means for locking said collar against rotation relative to said second housing;
    said means for locking including a locking lever rotatably mounted upon said second housing, said lever irrotational with respect to said second housing, said lever including means for gripping said handle to prevent rotation of said collar; and
    a handle extending from said collar for rotating said collar;
    whereby said first housing and said second housing may be fastened and unfastened by moving said handle when at least one of the pawls is in engagement with said teeth.

2. A coupling as in claim 1 wherein
    said means for gripping includes a clip further including elastic arms adapted to spring closed about said handle.

* * * * *